Feb. 1, 1966   W. M. ESSER ETAL   3,232,384
DRIVELINE DYNAMIC ABSORBER
Filed April 1, 1963   2 Sheets-Sheet 2
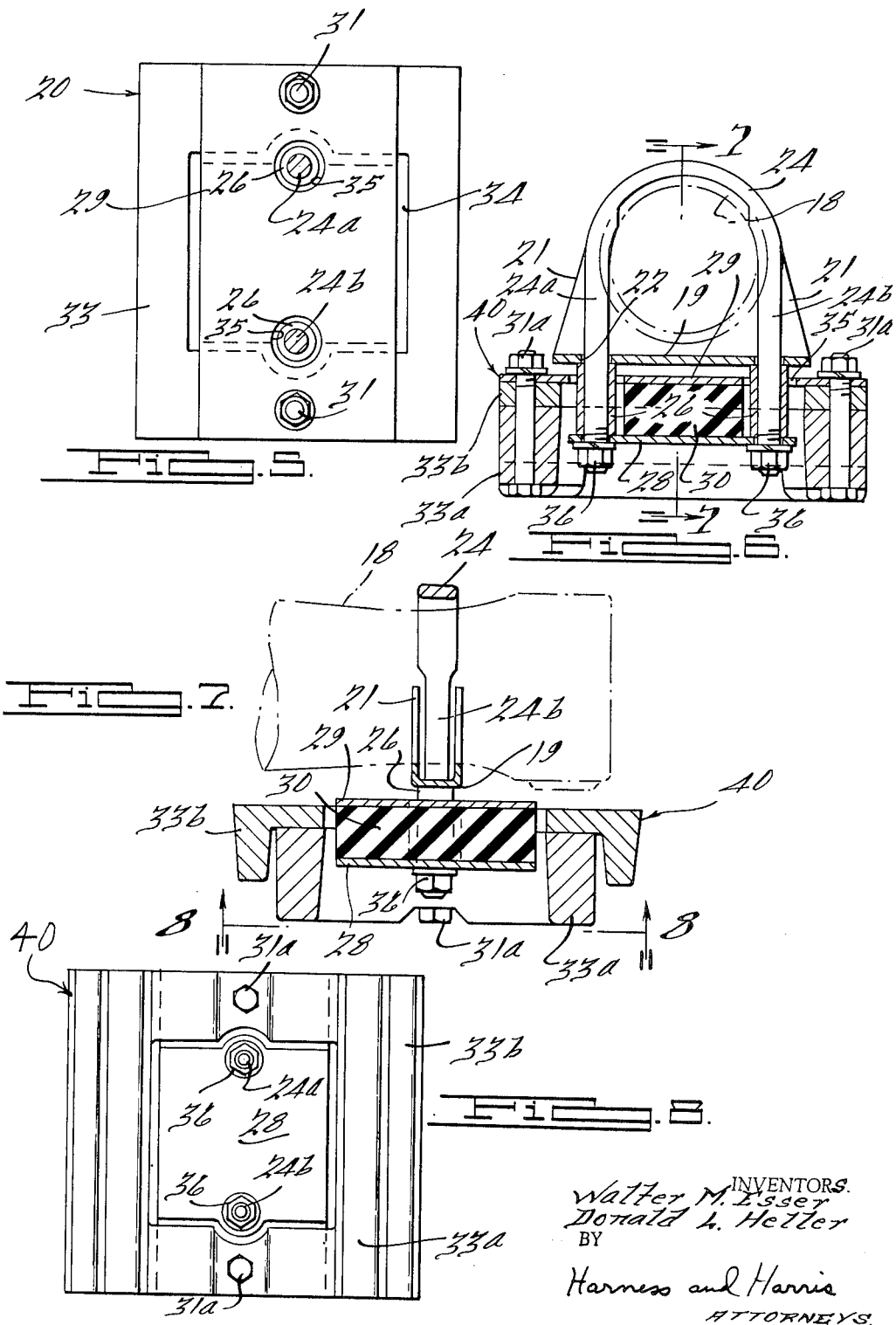
INVENTORS.
Walter M. Esser
Donald L. Heller
BY
Harness and Harris
ATTORNEYS.

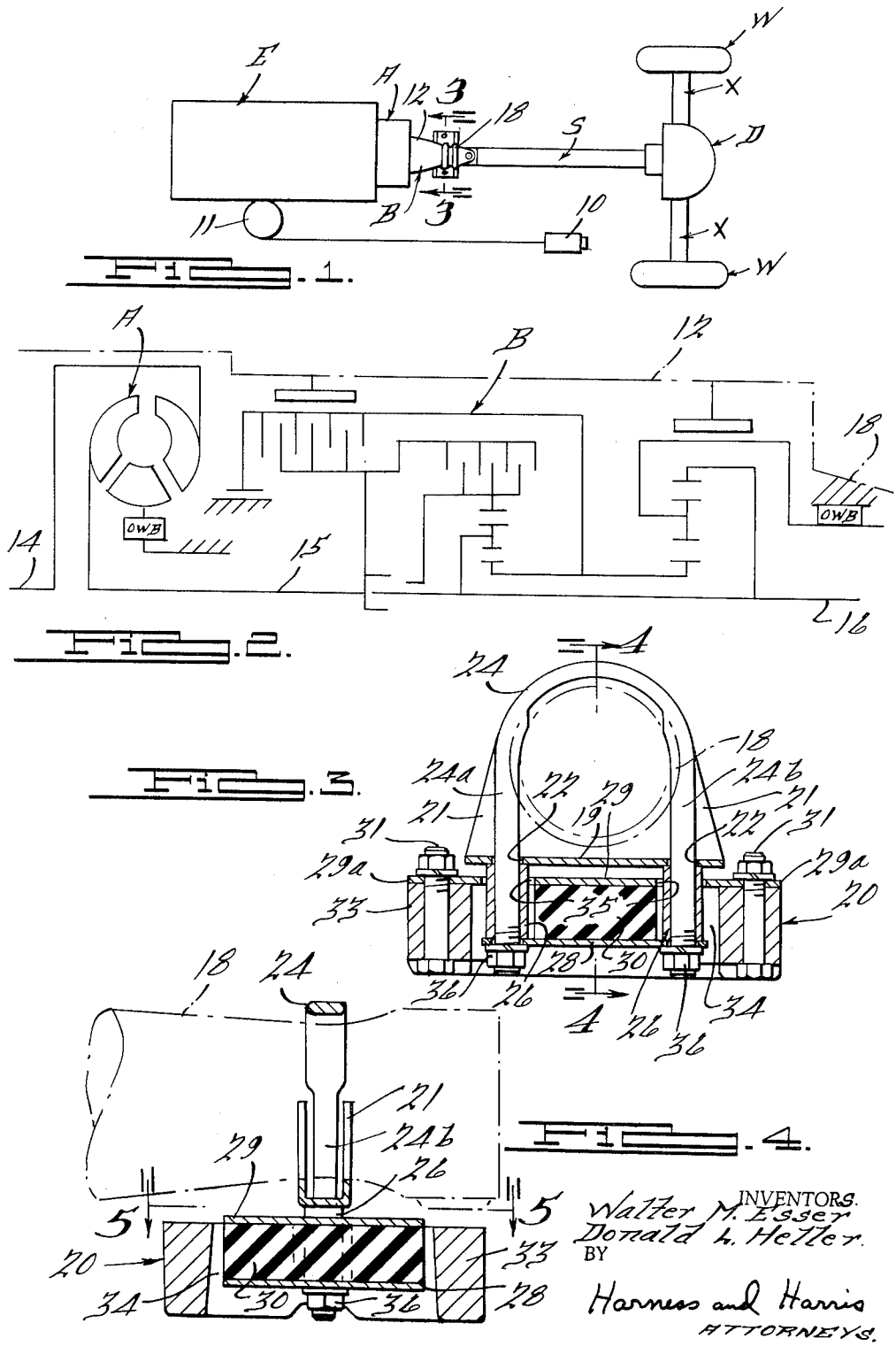

United States Patent Office 3,232,384
Patented Feb. 1, 1966

3,232,384
DRIVELINE DYNAMIC ABSORBER
Walter M. Esser, 16803 Stoepel, Detroit, Mich., and Donald L. Heller, 35843 W. Chicago Road, Livonia, Mich.
Filed Apr. 1, 1963, Ser. No. 269,554
2 Claims. (Cl. 188—1)

This invention relates to a driveline dynamic absorber and particularly to a rubber suspended weight used as a compression type dynamic absorber for a motor vehicle driveline.

It is a primary object of this invention to provide an improved, simplified type of driveline dynamic absorber that can be readily added as a service installed item or as original equipment to the existing driveline of current motor vehicle drive trains.

It is another object of this invention to provide an improved dynamic absorber having inherent damping action as a result of the rubber-like resilient weight supporting component used in the absorber.

It is still another object of this invention to provide a dynamic absorber for a vehicle drive line that can be mounted on the transmission or clutch housing, or on some rigid extension thereof by simple attachment means.

It is a further object of this invention to provide a driveline dynamic absorber that will effectively dissipate any objectionable vertical modes of vibration that may appear anywhere along the entire driveline.

It is a still further object of this invention to provide a dynamic absorber that is simple and economical in design, easy to install, occupies little space at a location where interference with other vehicle structure is least likely, is designed to fail safe, has a broad tolerance to mistuning and has inherent damping action.

Other objects and advantages of this invention will become readily apparent from a reading of the following description and a consideration of the related drawings wherein:

FIG. 1 is a schematic plan view of a motor vehicle drivetrain having a dynamic absorber applied thereto that embodies this invention;

FIG. 2 is a schematic line diagram of the FIG. 1 form of power transmission unit to the casing or housing of which this invention has been applied;

FIG. 3 is an enlarged sectional elevational view taken along the line 3—3 of FIG. 1 showing the dynamic absorber embodying this invention;

FIG. 4 is a sectional elevational view taken along the line 4—4 of FIG. 3;

FIG. 5 is a top plan view with parts in section, the view being taken in the direction of the arrows 5—5 of FIG. 4;

FIG. 6 is a sectional elevational view; similar to FIG. 3, of a modified form of this invention;

FIG. 7 is a sectional elevational view taken along the line of and in the direction of the arrows 7—7 of FIG. 6; and FIG. 8 is a bottom elevational view taken along the line of and in the direction of the arrows 8—8 of FIG. 7.

FIG. 1 of the drawings schematically discloses a motor vehicle power plant and driveline comprising an internal combustion engine E drivingly connected to a power transmission unit that consists of a torque converter unit A and a multi-speed planetary type gear box B. The output shaft of the gear box B is drivingly connected to the forward end of the propeller or drive shaft S that provides the input to the differential gear assembly D. A universal joint may be used at one or both ends of the shaft S if desired. The axles X, X transmit drive between the rear road wheels W, W and the differential gear assembly D. Engine E is controlled by an accelerator pedal 10 that is connected to the engine carburetor 11.

From FIG. 2 it will be noted that the casing or housing 12 encloses the torque converter A and the gear box B. The engine crankshaft, not shown, is drivingly connected to the torque converter input shaft 14 and the torque converter output shaft 15 is the input to the gear box B. The gear box B is of the two planetary, two clutch, two band type completely disclosed in B. W. Cartwright U.S. Patent 3,035,457. This transmission gear box will provide three forward drive speeds and a reverse drive. The output shaft 16 for gear box B is drivingly connected to the propeller or drive shaft S as previously described. Additional description of the gear box B is unnecessary for an understanding of this invention.

From FIGS. 1, 2 and 4 it is thought to be clear that the rear end of the transmission gear box casing or housing 12 has a reduced size tubular extension 18 that surrounds the gear box output shaft 16. This tubular rear extension 18 of the transmission casing 12 has been found to be the optimum place to mount a driveline dynamic absorber, particularly one of the type herein disclosed and indicated generally by the reference numerals 20 or 40.

Due to the nature of motor vehicle driveline constructions and engine firing, a resonance has been found to exist in certain vehicle drivelines or drive trains when the engine r.p.m. is in the range of 1000 to 2100. This would allow the 4th order frequency to be from 67 c.p.s. to 140 c.p.s. for V–8 engines. Similar 3rd order frequencies would be troublesome in 6 cylinder engine driven vehicles. Although this is a drive train resonance the engine speed is the important speed involved in vibration excited by engine firing. Similar vibration caused by universal joint excitation (2nd order) can cause the same type of vibration at the same frequency for a given vehicle but at the driveline r.p.m. which corresponds to this frequency for 2nd order excitation. This damper could be equally effective for reducing this vibration. Further investigation showed the problem to be a vertical mode of vibration along the entire driveline with 3 nodal points. The greatest measureable amplitude was found at the extreme rear of the transmission case extension 18 so this point was chosen as the most likely spot for application of a dynamic absorber.

Preliminary experiments demonstarted the need for a dynamic absorber with damping, that is, a rubber spring, rather than a steel spring for damping. The use of rubber provided the desired properties of damping and springing. Tests conducted with a simple absorber system showed the potential of this improved type of absorber. Tuning of the absorber was done intially by calculation and then changed slightly to provide maximum passenger comfort.

Several designs were tried but these were all variations of the basic system herein disclosed. The method of attaching the absorber 20 or 40 was also varied to meet stress and space limitations. The final design herein disclosed was chosen after analysis of these tests. This improved design has the absorber rubber loaded in compression so that a bonding failure between the rubber and its attached plate will not allow the absorber to come apart, i.e. it is fail safe. The improved design disclosed also doesn't have the tendency to accumulate dirt, water or other road residue. The design is quite compact, with the suspended weights surrounding the rubber spring. In addition to providing damping, the rubber spring has a broader tolerance to mistuning, which would mean that it would not require as close a tuning check in production as would steel springs, which are very sensitive to tuning.

FIGS. 3–5, in particular, show one form of dynamic absorber embodying this invention. In this form of the invention the transmission case extension 18 is provided with a channel-shaped bracket 19 having ears 21 that project outwardly from opposite sides of the tubular extension 18. These ears 21 each have a bore 22 in the bottom wall thereof to receive one of the legs 24a or 24b of the U-shaped clamping bolt 24. The U bolt 24 is mounted on the extension 18 in an inverted position so that the legs 24a and 24b thereof project downwardly and extend below the case extension 18. Mounted on the lower end portions of each of the bolt legs 24a, 24b is a sleeve 26 that serves as a spacer element as will become apparent hereafter. Also mounted on the lower end portions of the U-bolt legs 24a, 24b is the compression-type dynamic absorber element 20. Absorber 20 comprises a lower plate 28 and an upper plate 29 that have a resilient, rubber-like slab 30 positioned therebetween and bonded or otherwise suitably connected thereto. From FIG. 3 it is obvious that the upper plate 29 of the absorber 20 extends outwardly beyond the side edges of the resilient slab 30 and the lower plate 28. The outwardly projecting side edge portions 29a of the upper plate 29 are pierced by bores that receive bolt and nut assemblies 31. These bolt and nut assemblies 31 extend through and support a ring-like weight element 33. In the form herein disclosed the ring-like weight element 33 is of substantially rectangular or square plan configuration so as to provide a centrally located open space 34. The open space 34 within the ring-like weight 33 is of such a size that it will receive the resilient, rubber-like slab 30 and the lower plate 28 of the dynamic absorber element 20.

From the foregoing description it is thought to be clear that after mounting the U-bolt 24 in the extension bracket 19 that then the sleeves 26 can be placed on the lower ends of the bolt leg portions 24a, 24b. Thereafter the absorber unit 28–33 is mounted on the lower end portions of the U-bolt legs 24a, 24b by extending the bolt legs through the plate openings 35. It will be noted that the openings 35 in the upper plate 29 that receive the U-bolt legs and spacers 26 are of such a size that there is adequate clearance to prevent engagement between the plate 29 and the spacers 26. When the nuts 36 are turned up on the threaded lower ends of the U-bolt legs 24a, 24b, the lower plate 28 will be firmly anchored against the bottom of bracket 19 by means of the spacer sleeves 26.

With the arrangement herebefore described, it is thought to be clear that the weight element 33 can vibrate with respect to the lower plate 28. Plate 28 is firmly anchored to the transmission case extension 18 by the U-bolt 24. Vertical vibration of the weight 33 with respect to lower plate 28 will compress the rubber-like resilient slab 30. The resilient characteristics of the rubber-like slab 30 provides inherent frictional damping action for any vibrations that may be transmitted by the driveline.

It has been found that in certain transmission gear ratios and at certain engine speeds that engine combustion chamber firing sets up a fourth order "noise" or resonance that is speed sensitive. This resonance sets up vibrations that provide a standing wave vertical node with usually three (3) nodal points along the driveline. From experimentation it has been found that it is best to locate the disclosed dynamic absorber at an anti-nodal point and the location adjacent the rear end of the transmission case extension 18 has proven to be an optimum position for the disclosed type of dynamic absorber.

FIGS. 6–8 show a modified form of the invention shown specifically in FIGS. 3–5. The FIGS. 6–8 form clearly brings out the flexibility of the basic unit embodied in FIGS. 3–5. The FIGS. 6–8 form of the invention has a large portion thereof identical to the FIGS. 3–5 form and these common parts bear the same reference numerals utilized in FIGS. 3–5. Essentially the dynamic absorber 40 shown in FIGS. 6–8 includes the structure of FIGS. 3–5 and adds thereto the additional weight 33b. The weight ring 33b is of substantially square or rectangular plan configuration so that it will seat upon the lower weight element 33a. In cross-sectional configuration the upper weight is of an inverted L-shape or an angle-iron shape. A pair of connector bolt and nut assemblies 31a interconnect the pair of weights 33a, 33b and the top plate 29 of the resilient supporting sandwich 28–30. By the use of the second weight element 33b, it is possible to adapt the FIGS. 3–5 absorber unit for vehicles of much larger size than those normally employing the FIGS. 3–5 unit. Also the FIGS. 6–8 unit can be used where a vibrational disturbance of greater magnitude is encountered. It is thought to be clear that the build-up of additional weight means, by the use of a series of weights and the variation in the hardness or resilience of the rubber-like slab 30, gives great flexibility to the disclosed type of dynamic absorber. Although the additional weight used in damper 40 can be used to advantage in certain larger size vehicles, still, this is not necessarily intended for a larger vehicle. It is the combination of the rubber stiffness and the amount of weight suspended that gives the tuning. This tuning is dictated by the frequency of the vibration problem in the vehicle in question. It can be readily seen that the damper size (both rubber stiffness and weight) can be increased to give additional effectiveness. In general, the smallest combination that will do the job is desirable both for cost and space considerations. In our case we chose to make most of the parts identical for our two large and small vehicle applications. Therefore, we use a two-piece weight (see FIGS. 6–8) for the Chrysler Imperial model or large car and the single weight (see FIGS. 3–5) for most of our small and medium size car applications.

Not only does the disclosed dynamic absorber provide means to dissipate vertically directed vibratory disturbances, but in addition shear stresses in the resilient rubber-like slab 30 will also act to dissipate vibratory disturbances that may extend in other than a vertical plane.

We claim:

1. A damped dynamic vibration absorber adapted to be mounted on a tubular transmission casing extension comprising an inverted, vertically disposed, U-shaped bolt shaped to be carried by the tubular transmission extension in surrounding relationship with the leg portions thereof projecting beneath said extension, a first lower, horizontally disposed plate supported by and extending between said depending bolt leg portions, a slab of rubber-like material fixedly supported on the top of said first plate and arranged between and spaced from said bolt leg portions, a second upper horizontally disposed plate fixedly connected to and floatingly supported on the top of said slab of rubber-like material and spaced from said bolt leg portions so as to be free of contact therewith, and a weight member carried by and symmetrically positioned on said second upper plate member compressively loading said slab of rubber-like material, said weight member comprising an apertured plate that symmetrically surrounds and is spaced from said weight supporting rubber-like slab and is free to vibrate relative to said bolt to damp vibrations transmitted thereto.

2. A damped dynamic vibration absorber as set forth in claim 1 wherein said weight member comprises a plurality of weight elements detachably interconnected to provide for weight variation.

References Cited by the Examiner
UNITED STATES PATENTS

| | | | |
|---|---|---|---|
| 2,707,032 | 4/1955 | Burton | 188—1 X |
| 2,724,463 | 11/1955 | Becker. | |

FOREIGN PATENTS

| | | |
|---|---|---|
| 685,503 | 1/1953 | Great Britain. |
| 763,754 | 12/1956 | Great Britain. |
| 1,157,877 | 1/1958 | France. |

MILTON BUCHLER, *Primary Examiner.*

BROUGHTON G. DURHAM, ARTHUR L. LA POINT,
*Examiners.*